US011261931B2

(12) United States Patent
Farid

(10) Patent No.: US 11,261,931 B2
(45) Date of Patent: Mar. 1, 2022

(54) HYBRID ROTATIONAL PASSIVE ENERGY ABSORBER

(71) Applicant: Massachusetts Institute of Technology, Cambridge, MA (US)

(72) Inventor: Maor Farid, Brighton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/937,677

(22) Filed: Jul. 24, 2020

(65) Prior Publication Data

US 2022/0025949 A1    Jan. 27, 2022

(51) Int. Cl.
*F16F 7/10* (2006.01)

(52) U.S. Cl.
CPC ............ *F16F 7/10* (2013.01); *F16F 2222/08* (2013.01); *F16F 2224/0208* (2013.01); *F16F 2230/10* (2013.01); *F16F 2232/02* (2013.01)

(58) Field of Classification Search
CPC .... F16F 15/14; F16F 15/1428; F16F 15/1485; F16F 7/10; F16F 7/1022
See application file for complete search history.

(56) References Cited

U.S. PATENT DOCUMENTS

| 989,958 | A | * | 4/1911 | Frahm | F16F 7/1022 |
| | | | | | 188/380 |
| 2,379,255 | A | * | 6/1945 | Rubissow | F16F 15/145 |
| | | | | | 74/574.3 |
| 3,314,503 | A | * | 4/1967 | Neubert | F16F 15/10 |
| | | | | | 188/379 |
| 3,940,895 | A | * | 3/1976 | Yamamoto | E04H 9/0215 |
| | | | | | 52/167.1 |
| 4,527,951 | A | * | 7/1985 | Trier | B64C 27/001 |
| | | | | | 188/378 |
| 2010/0107807 | A1 | | 5/2010 | Starossek | |
| 2012/0304808 | A1 | | 12/2012 | Amano et al. | |
| 2013/0326969 | A1 | | 12/2013 | Kienholz et al. | |

(Continued)

FOREIGN PATENT DOCUMENTS

| DE | 102016221597 A1 * | 5/2018 | ............ B63G 8/001 |
| DE | 102018004550 A1 * | 12/2019 | ............ F16F 15/134 |
| JP | 58163844 A * | 9/1983 | ............. F16F 15/14 |

OTHER PUBLICATIONS

International Search Report and Written Opinion for PCT/US20/43603 dated Oct. 30, 2020.

(Continued)

*Primary Examiner* — Melanie Torres Williams
(74) *Attorney, Agent, or Firm* — Peter A. Nieves; Sheehan Phinney Bass & Green PA

(57) ABSTRACT

A hybrid rotational passive energy absorber (100) is configured to mitigate effects of a load on an attached system. An axle (170) is anchored to a housing (110) at a first axle end and a second axle end. A free swinging weighted arm (180) includes a beam (130) having a length L, a pivot portion (185) disposed at a first end of the beam, and an internal mass (120) at a second end of the beam. A bearing (160) rotatably connects the pivot portion to the axle. The bearing is configured to provide smooth motion of the weighted arm around an axis (150) of the axle in a rotation and/or oscillation plane orthogonal to the axis.

9 Claims, 9 Drawing Sheets

(56) References Cited

U.S. PATENT DOCUMENTS

2016/0169320 A1* 6/2016 Suzuki ................ F16F 15/145
                                                    188/378
2016/0264236 A1   9/2016 Hocquette

OTHER PUBLICATIONS

Tuned Mass Damper Demonstration (practicalengineering) Feb. 17, 2016; retrieved online from https://www.instructables.com/id/Tuned-Mass-Damper-Demonstration/.

* cited by examiner

HYBRID ROTATIONAL PASSIVE ENERGY ABSORBER

FIELD OF THE INVENTION

The present invention relates to energy transfer devices, and in particular to a passive oscillating and rotating energy absorber.

BACKGROUND OF THE INVENTION

When subjected to external loadings and disturbances, engineering systems from various fields and industries are exposed to destructive vibration, for example in the aviation, space, naval, chemical, nuclear, and automotive industries. Existing vibration mitigation solutions include suspensions, active and passive vibration mitigation methods. Passive energy absorbers (PEAs) operate by channeling the undesired vibration energy from a main system to a smaller PEA attached to the main system. The PEA converts the energy to heat via friction. PEAs are known effective and reliable for destructive vibration prevention under various excitation types, such as impulsive, periodic, and stochastic loading. However, current PEA models suffer from a mutual shortcoming of effectiveness only in a limited energy range.

During their life-time, structures or mechanical systems are typically exposed to undesired vibration due to their functionality (for example rotating systems, motored machinery) and external disturbances (such as wind, seismic excitation) which can lead to destructive consequences. Passive energy absorbers (PEAs) have been attempted as a solution. For example, a PEA may be a relatively small attachment to the primary structure of interest that passively absorbs the undesired and potentially hazardous energy. Various PEA designs and concepts have been attempted, generally classified in two groups: tuned mass dampers (TMDs) and the nonlinear energy sinks (NESs). A TMD is a linear system, and hence is effective only when the primary structure (PS) is vibration very near its natural frequency, i.e. its effective only for a small frequency range. Moreover, for high intensity vibration a TMD becomes ineffective since a TMD requires large spaces or loses its linearity due to large-amplitude oscillations. In contrast, NES have essential nonlinearities that allows them to adapt their oscillations frequency and hence can be effective for a broader frequency range. Moreover, their nonlinear and more sophisticated design allows NES to be more compact with respect to the TMDs. However, the NES designs suffer from a common shortcoming of effectiveness for merely high intensity vibration. When the PS perform small amplitude oscillations, the nonlinearity of the NES cannot come into play and as a result the NES does not perform significant oscillations and absorb the undesired energy from the PS into the NES. For example, the rotational NES can rotate in the plane of excitation around a vertical axis. Here, the NES performs well when the PS performs intensive vibration and manages to mitigate its vibration. However, for lower vibration intensities the rotational mass does not manage to perform rotations and hence only a low portion of the energy is absorbed into the rotational PEA. Therefore, there is a need in the industry to address one or more of these shortcomings.

SUMMARY OF THE INVENTION

Embodiments of the present invention provide a hybrid rotational passive energy absorber. Briefly described, the present invention is directed to hybrid rotational passive energy absorber configured to mitigate effects of a load on an attached system. An axle is anchored to a housing at a first axle end and a second axle end. A free swinging weighted arm includes a beam having a length L, a pivot portion disposed at a first end of the beam, and an internal mass at a second end of the beam. A bearing rotatably connects the pivot portion to the axle. The bearing is configured to provide smooth motion of the weighted arm around an axis of the axle in a rotation and/or oscillation plane orthogonal to the axis.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1A:
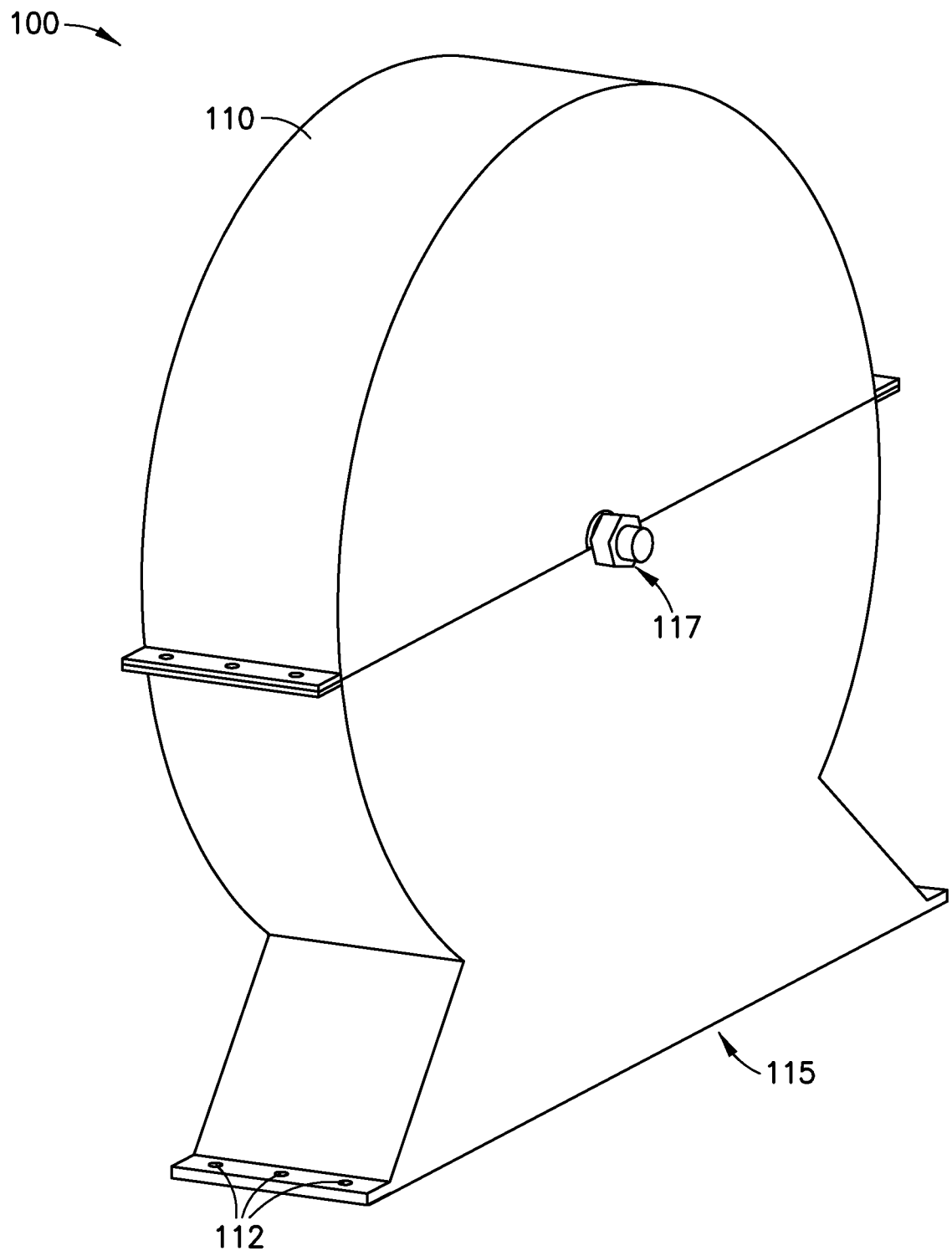
FIG. 1A is a schematic drawing showing an external view of a first embodiment of a hybrid-rotational passive energy absorber (HR-PEA).

The following definitions are useful for interpreting terms applied to features of the embodiments disclosed herein, and are meant only to define elements within the disclosure.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention include a Hybrid Rotational PEA (HR-PEA). The HR-PEA hybridizes the advantages of both a linear PEA, referred to as tuned mass damper (TMD), and a nonlinear PEA (referred to as nonlinear energy sink (NES)), without suffering from their drawbacks. In scenarios where the energy excitations are small relative to the size and/or mass of the HR-PEA, the HR-PEA performs oscillations (i.e. not full rotations) and acts like a TMD, while for high energies relative to the size and/or mass of the HR-PEA the HR-PEA performs rotations, and serves like a NES. It is noteworthy that the level of energy intensity (small energy excitations vs. high energies) is relative to the size and/or mass of the PEA, such that a given energy level may be considered to be high for a small PEA and low for a large PEA. Specific numerical examples are provided below.

Due to its essential nonlinearity (due to the rotations), the HR-PEA has the ability to adopt the frequency of the excitation and to resonate with an attached main system, thereby mitigating the effects of load/vibration upon the main system. Since the HR-PEA passively adapts its behavior to respond to small energy and high energy excitations, the HR-PEA provides a highly efficient energy transfer mechanism.

Figure 1B:
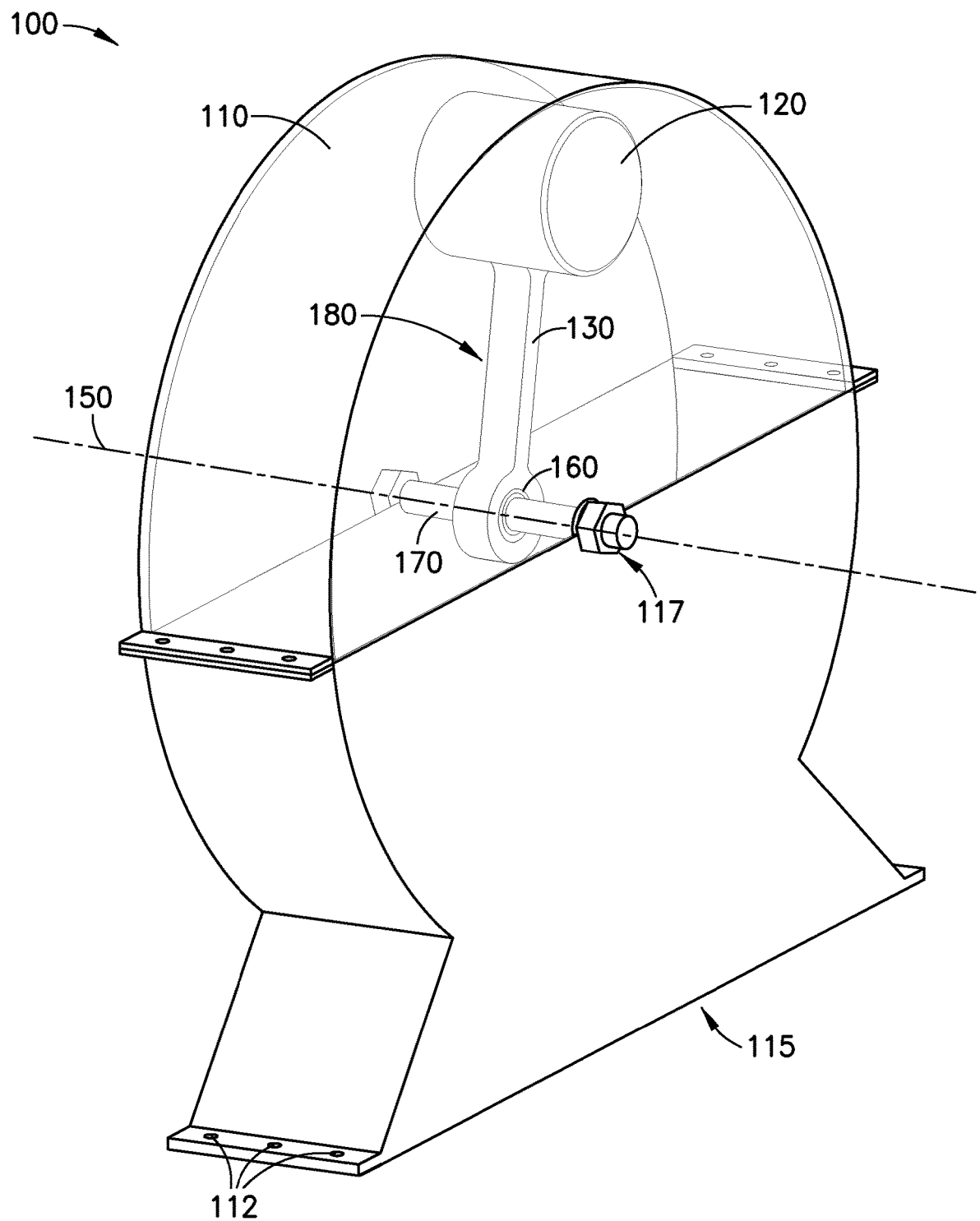
FIG. 1B is an alternative view of FIG. 1A having a partially transparent housing.
Figure 2:
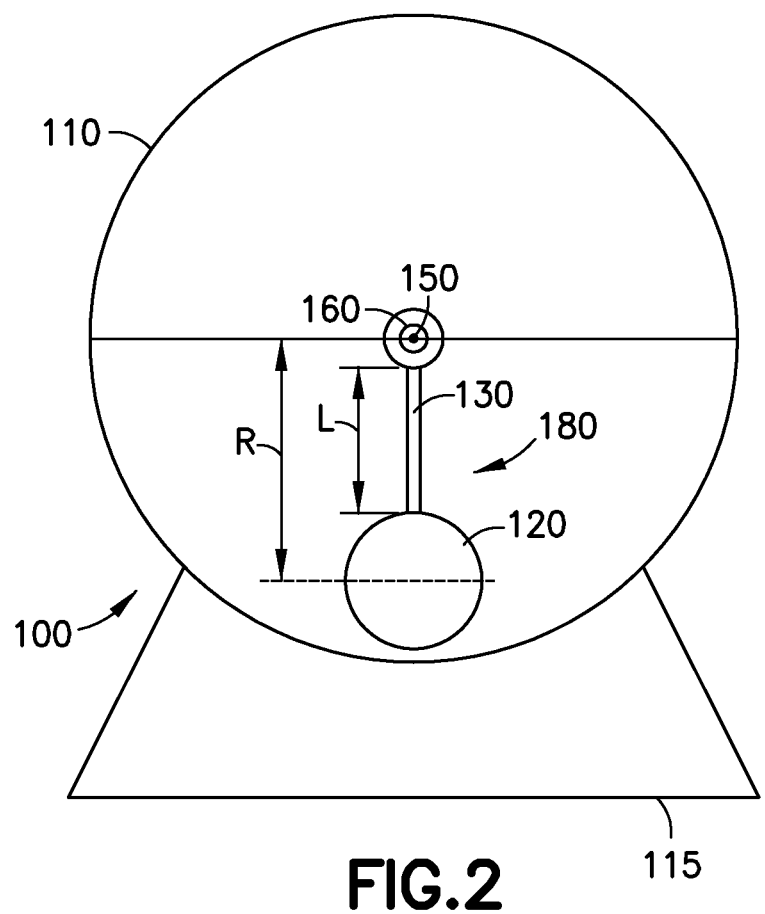
FIG. 2 is a schematic drawing detailing the functional components of the HR-PEA of FIG. 1B.

FIG. 1A shows a first exemplary embodiment of a HR-PEA 100. A housing 110 of the HR-PEA 100 may be made of a rigid material which allows the housing 110 to withstand intense external disturbances. For example, under the first embodiment the housing 110 is made from stainless steel, but other suitable materials may be substituted for particular applications. The housing 110 is attached to the main system via interface holes 112 located in its bottom face, for example, by bolts or other fasteners. FIG. 1B and FIG. 2 illustrate the internals of HR-PEA of FIG. 1A. A free-swinging weighted arm 180 includes a pivot portion 185 at a first end and an internal mass (IM) 120 at a second end of the weighted arm 180, connected by a connecting beam 130 having a length L. The parameters of the HR-PEA (i.e. arm size, weight, and friction) are tuned according to a PS of interest using computational analysis in which the vibration mitigation effect of the HR-PEA with varying parameters is considered. The analysis may be performed, for example, using various simulation programs and software. In the example shown below, the PS and the HR-NES were modeled using MATLAB, and the HR-PEA parameters were chosen using numerical optimization.

The pivot portion 185 is mounted on a shaft 170 or axle passing through a bearing 160 that allows smooth rotation of the weighted arm 180 around a shaft axis 150. The friction associated with the rotation of the bearing 160 is the source of energy dissipation of the HR-PEA, which is essential for dissipating the energy from the PS by converting it into heat. The shaft 170 may be, for example, a long bolt, which is fixed and tightened to the housing 110 for example, using a nut 117. Sizes and dimensions are shown in the figure below.

Figure 3B:
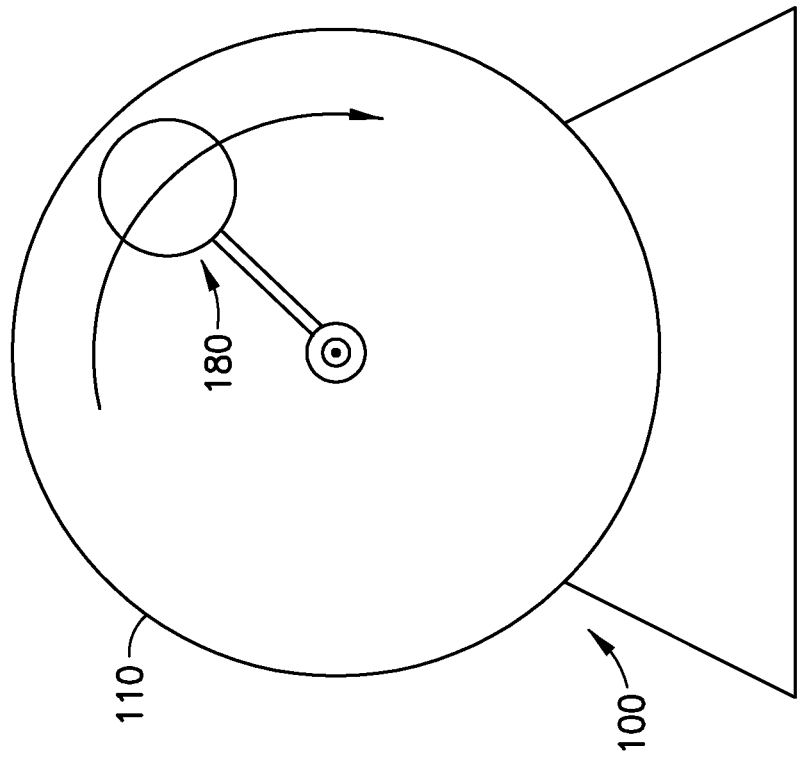
FIG. 3B is a schematic diagram of the HR-PEA of FIG. 1B in rotation mode.
Figure 3A:
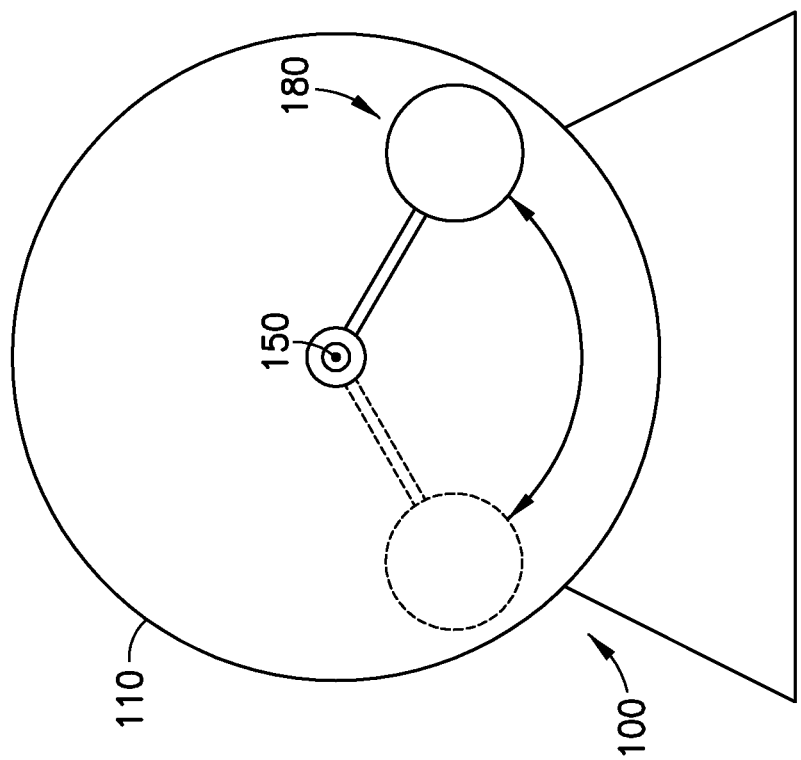
FIG. 3A is a schematic diagram of the HR-PEA of FIG. 1B in oscillatory mode.

As shown by FIG. 2, R indicates the distance between the shaft axis 150 and a center of gravity of the internal mass 120 in a plane of rotation and/or oscillation of the weighted arm 180 within the housing 110. As shown by FIG. 3A, the geometry of the HR-PEA 100 allows the free-swinging weighted arm 180 to perform small amplitude angular oscillations (oscillatory mode) in the plane of rotation when the main system is exposed to low-moderate energy loading, and as shown by FIG. 3B, intense rotations (rotation mode) for high energies. The intensity of a given energy level is relative to the size of the HR-PEA, i.e. a given energy can be high for small HR-PEA and low for a large on. Numerical examples are provided in the example below.

Oscillatory mode leads to affect vibration mitigation for low and moderate energies, while rotational mode provides vibration mitigation for moderate to high energies. The process of energy absorption works as follows; undesired vibrational energy enters the PS and makes it vibrate in a corresponding intensity. The PEA which is attached to the PS starts to vibrate as well, due to energy flow from the PS to the PEA in a dynamical mechanism called targeted energy transfer. When the energy enters the PEA is dissipated to heat due to the friction of the PEA and in this way leaves the system. The ability of a PEA to absorb and dissipate undesired energy is referred to as its efficiency. As mentioned above, the TMS are effective only for narrow frequency and for low energy levels (or intensities) while NES are effective for a broader frequency range and only moderate energy levels. In general, to achieve optimal effectiveness of a given PEA, it should be attached to the PS so its orientation will be alleged with the direction of vibration of the PS, because in this way the PEA can absorb the largest amount of energy from the PS.

Figure 4:
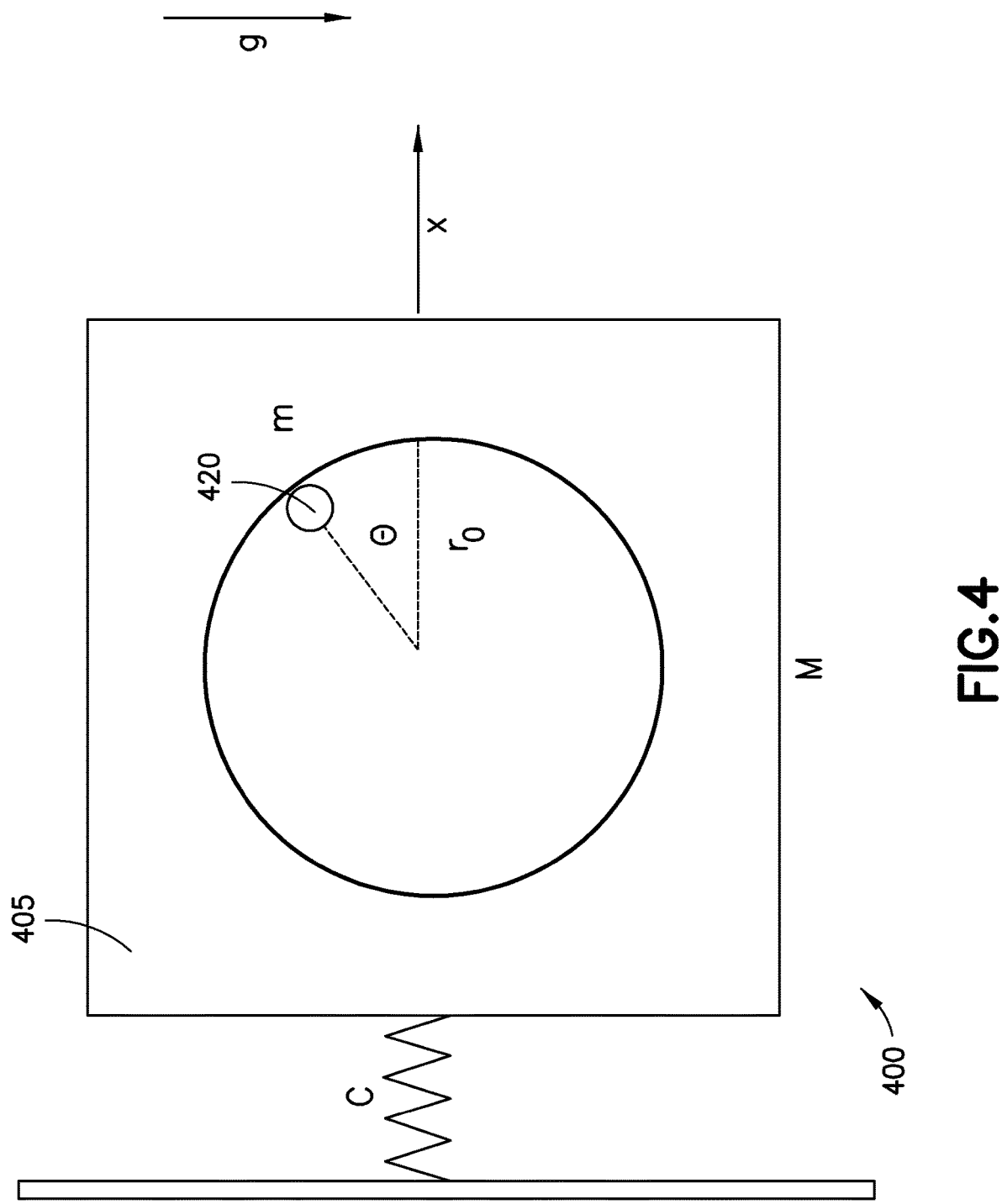
FIG. 4 is a schematic diagram of a model used to describe the behavior of the HR-PEA of FIG. 1A.

A mathematical description of the HR-PEA for the embodiments described above is presented here. The PS and the HR-PEA (collectively referred to as the overall system 400), are modelled be an equivalent and simplified mechanical system shown in FIG. 4. Even though simplified, this reduced order model 400 captures and describes the relevant dynamical regimes that take place in the overall system. The PS 405 is modelled by the gray square mass with mass M and the PEA with a marble 420 of mass m that can move freely on the circular blue trajectory with arm in length $r_0$. The direction of oscillation of the PS 405 is denoted by x, and the direction of gravity force by the vector g. The stiffness of the PS 405 is denoted by C and the damping associated with rotations around the shaft is denoted by v. The angle of rotation of the HR-PEA is denoted by θ.

The normalized and nondimensional equations of motion describing the system's dynamics are as follows:

$$u_{\tau\tau} + u = \varepsilon \frac{d}{d\tau}(\theta_\tau \sin\theta) \qquad \text{(Eq. 1)}$$

$$\theta_{\tau\tau} + \lambda\theta_\tau = u_{\tau\tau}\sin\theta - \beta\cos\theta$$

Where the nondimensional degrees of freedom (DOFs) and parameters are defined as follows:

$$\omega_0 = \sqrt{C/(m+M)}, \quad u = x/r_0, \quad \varepsilon = m/(m+M), \qquad \text{(Eq. 2)}$$

$$\lambda = v/mr_0^2\omega_0, \qquad \Omega_0^2 = g/r_0$$

$$\tau = \omega_0 t; \qquad \frac{d}{dt} = \omega_0 \frac{d}{d\tau}$$

Here u is the displacement of the PS 405 normalized by the arm length of the PEA 420. The characteristic parameters of the PEA are ε, $\beta=\Omega_0^2/\omega_0^2$, γ, which represent the mass ratio, natural frequencies ratio between the PS and the PEA, and nondimensional damping coefficient, respectively. The dimensionless time scale is denoted by τ. The energy captures in the overall system, in the PS 405 and in the HR-PEA are as follows:

$$E = E_p + E_H \quad \text{(Eq. 3)}$$

$$E_p = \frac{1}{2}(M\dot{x}_t^2 + Cx^2)$$

$$E_H = \frac{m}{2}(\dot{x}_t^2 + r_0^2\dot{\theta}_t^2 - 2r_0\dot{x}_t\dot{\theta}_t\sin\theta) + mgr_0(1+\sin\theta)$$

The percentile portion of the overall energy that carried by the PEA is denoted by κ and given by the following expression:

$$\kappa = E_H / E = \frac{\varepsilon(\dot{u}^2 + \dot{\theta}^2 - 2\dot{u}\dot{\theta}\sin\theta + 2\beta(1+\sin\theta))}{u^2 + \dot{u}^2 + \varepsilon(\dot{\theta}^2 - 2\dot{u}\dot{\theta}\sin\theta + 2\beta(1+\sin\theta))} \quad \text{(Eq. 4)}$$

The aim is to find optimal set of design parameters that will allow optimal absorption performances, i.e. will lead to highest values of κ. We can also observe the amount of energy left in the overall system. For a system which is subjected to impulsive loading, this amount can be described by the following expression:

$$\rho(\tau) = \frac{\dot{u}^2 + u^2 + \varepsilon(\dot{\theta}^2 - 2\dot{u}\dot{\theta}\sin\theta + 2\beta(1+\sin\theta))}{\dot{u}_0^2 + u_0^2 + \varepsilon(\dot{\theta}_0^2 - 2\dot{u}_0\dot{\theta}_0\sin\theta_0 + 2\beta(1+\sin\theta_0))} \quad \text{(Eq. 5)}$$

Figure 5C:
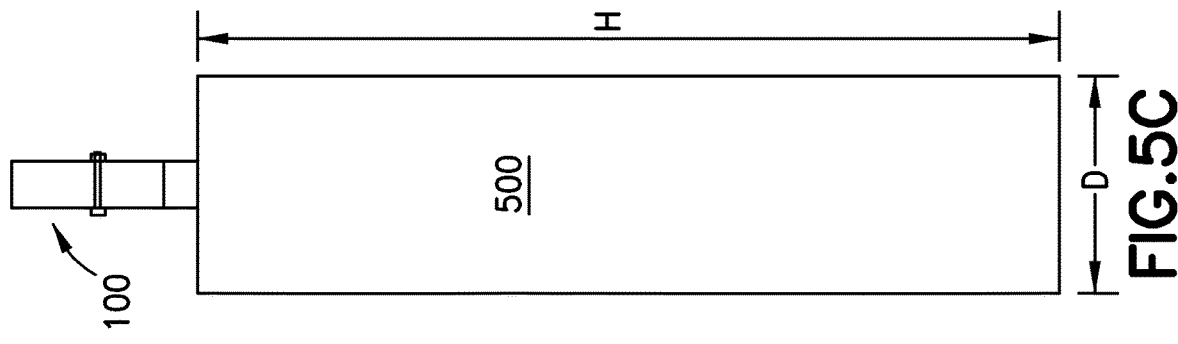
FIG. 5C is a schematic drawing of the system of FIG. 5A a side view.
Figure 5B:
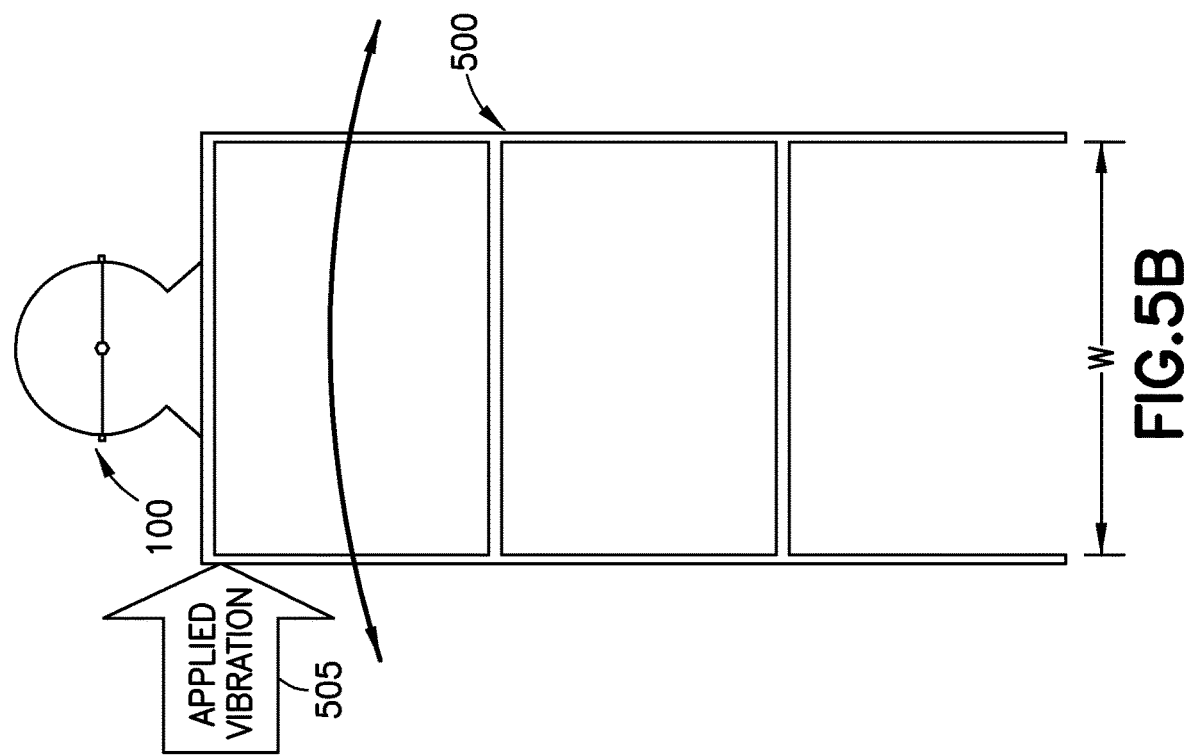
FIG. 5B is a schematic drawing of the system of FIG. 5A a front view.
Figure 5A:
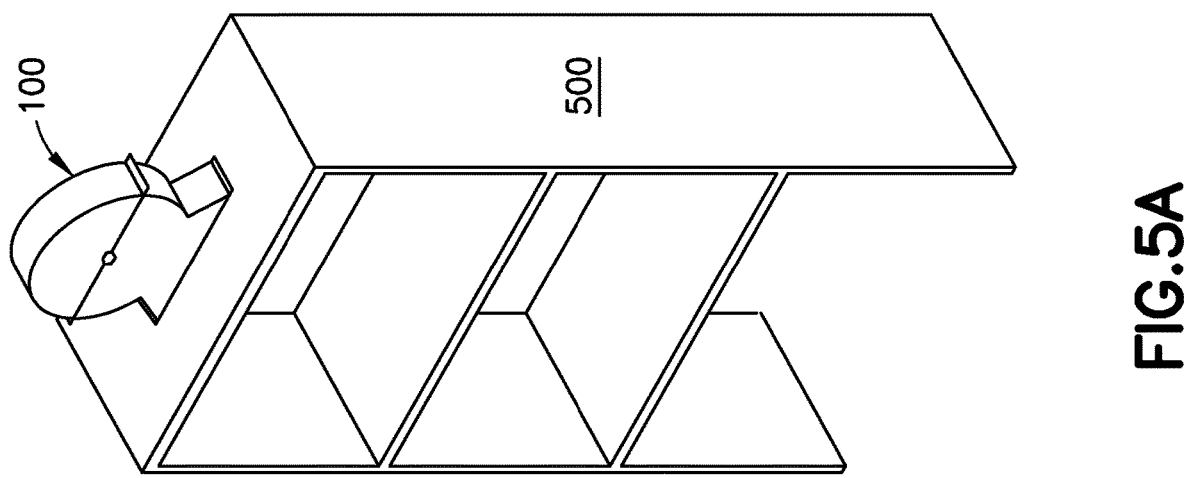
FIG. 5A is a schematic drawing of the first embodiment of system with an HR-PEA of FIG. 1A attached to a structure of interest from a perspective view.

For non-limiting exemplary purposes only, a specific example applying the above model to the embodiment of the HR-PEA 100 of FIG. 1A is presented. The absorption performances of the HR-PEA 100 are demonstrated by attaching the exemplary HR-PEA 100 to a PS 500, here a multi-story structure 500, as shown by FIGS. 5A-5C. The height H of the exemplary PS 500 is 2000 mm, the width W is 750 mm, the depth D is 400 mm. The thickness of each story is 10 mm, and the thickness of the external vertical beams is 20 mm. As shown in FIGS. 5A-5C, the structure 500 contains three stories with identical heights. The structure 500 is made of 2040 Aluminum Alloy with a density of ρ=2800 kg/m³ and module of elasticity of E=73 GPa. The mass of the PS 500 is 113.5 kg, and the natural frequency of the PS 500 that corresponds to the undesired oscillatory mode is 6.63 Hz. Here, the HR-PEA 100 is mounted to the highest story of the PS 500, where motion of the PS 500 as a result of an applied vibration 505 is of the largest amplitude, i.e. highest vibration energy, as indicated by the thick black arrow shown in FIG. 5B. A plane of oscillation and/or rotation of the weighted arm 180 (FIG. 2) of the HR-PEA 100 is parallel to the applied vibration 505.

For purposes of the present example, the mass of the rotating element of the HR-PEA 100 was chosen to be 11.3 kg, here corresponding to approximately 10% of the mass of the PS 500. The arm length L (FIG. 2) was chosen to be 220 mm (so that the natural frequencies of both the HR-PEA 100 and the PS 500 will be equal, i.e. approximately 6.6 Hz), and the damping coefficient is given by the specification of the bearing 160 (FIG. 2) and equals to approximately γ=0.01.

The above example should not be construed as limiting, as the HR-PEA 100 may be scaled and adapted to mitigate vibration on systems both larger and smaller than the above example, even much larger and much smaller.

Figure 5D:
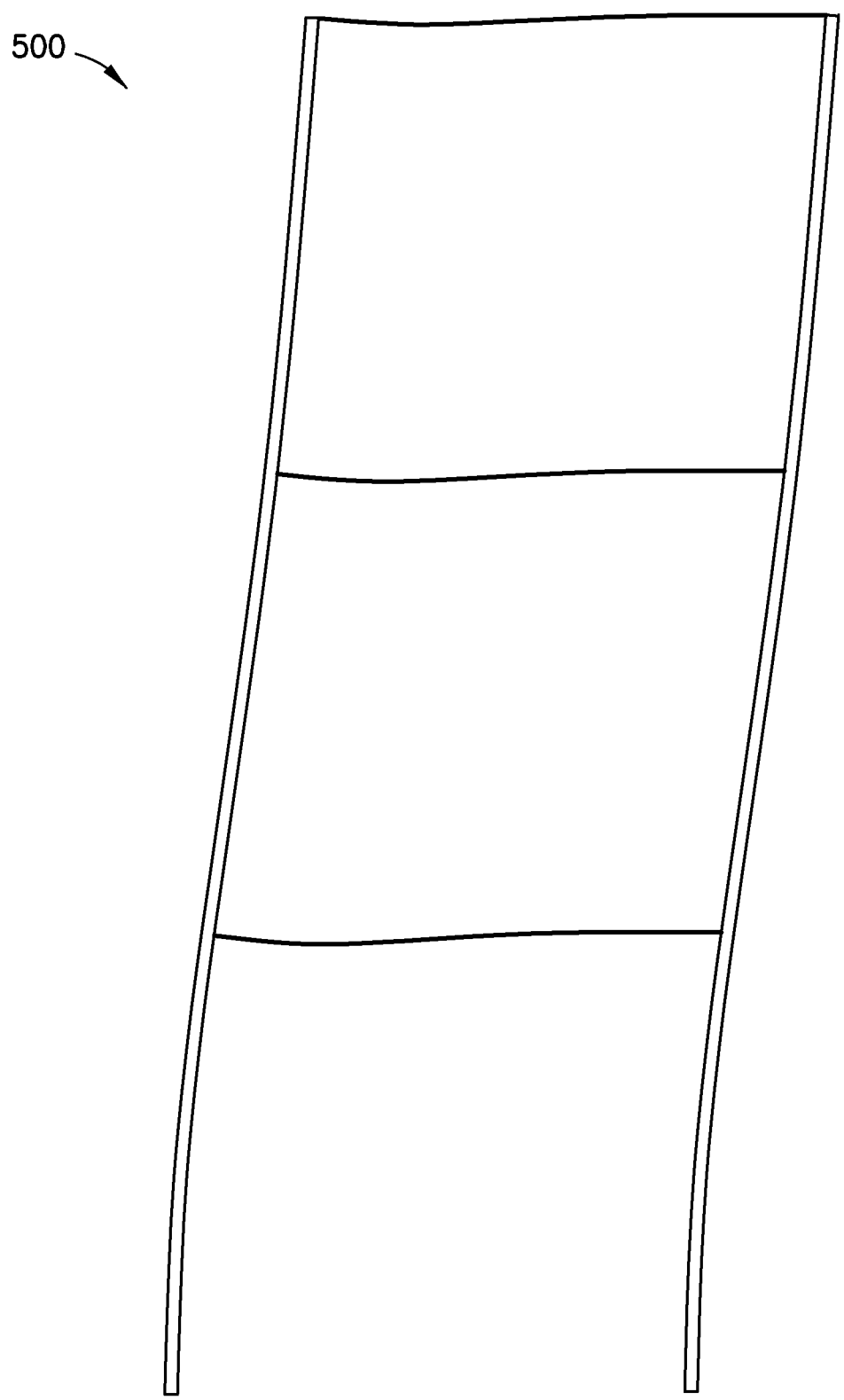
FIG. 5D is a schematic drawing of the structure of interest of FIG. 5A deforming under a vibrational load.

For the sake of demonstration, the PS 500 was subjected to impulsive loading applied on the upper floor which corresponds to a nonzero initial velocity. FIG. 5D shows a snapshot in time of the PS 500 in a deformed state under an active vibration mode for mitigation, here a first ending mode with a frequency of 6.64 Hz.

Figure 6A:
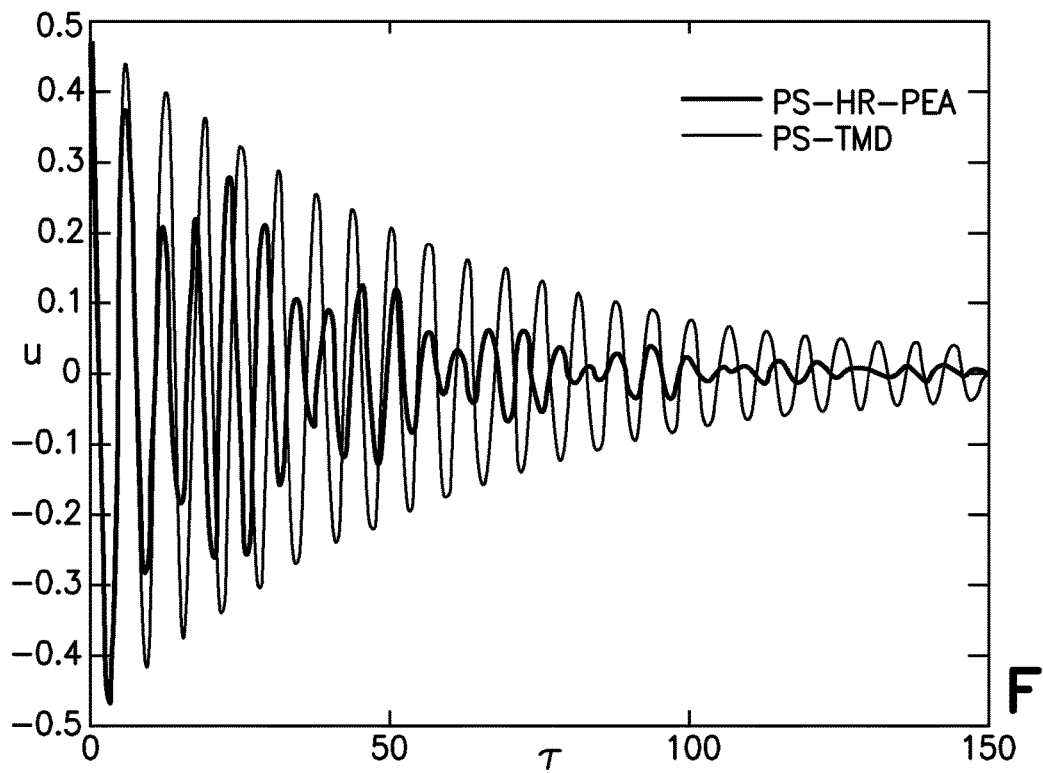
FIG. 6 shows plots comparing performance of the HR-PEA of FIG. 5 with a TMD.
Figure 6B:
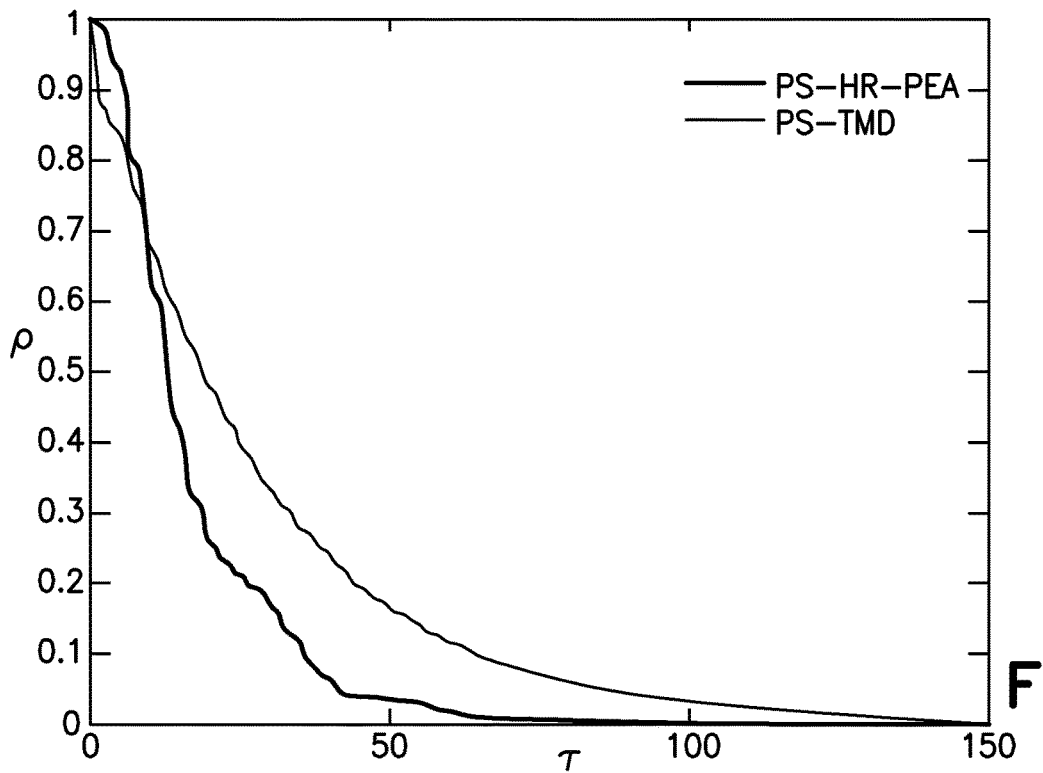

For purposes of comparison, the same process was applied with a TMD as a PEA. The results are compared in FIG. 6. As shown in the drawings, the energy dissipation using the HR-PEA is much faster than when using the TMD.

Figure 7:
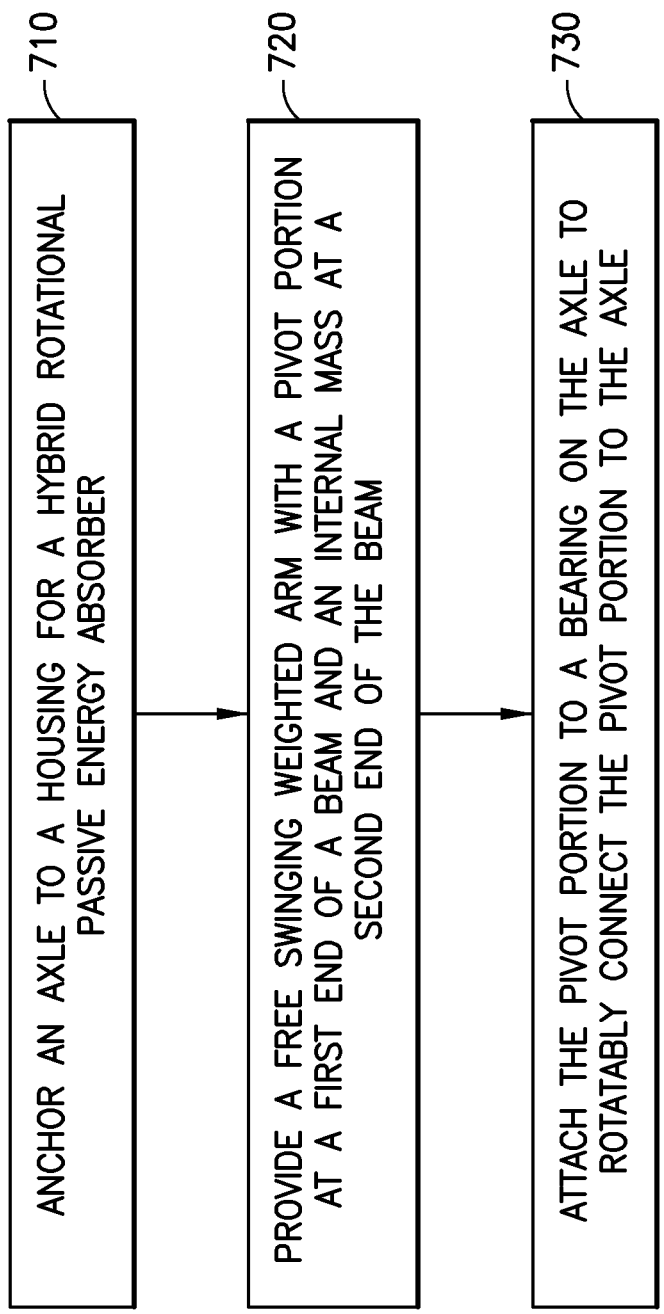
FIG. 7 is a flowchart of an exemplary embodiment of a method for mitigating vibration in a system.

FIG. 7 is a flowchart of an exemplary embodiment of a method for mitigating vibration in a system. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with respect to FIG. 2.

An axle 170 is attached to a housing 110 for a hybrid rotational passive energy absorber 100, as shown by block 710. A free swinging weighted arm 180 is provided with a beam 130 having a length L, a pivot portion 185 disposed at a first end of the beam, and an internal mass 120 at a second end of the beam 130, as shown by block 720. The pivot portion is attached to a bearing (160) on the axle 170 to rotatably connect the pivot portion 185 to the axle 170, as shown by block 730. The bearing is configured to provide smooth motion of the weighted arm around an axis (150) of the axle in a rotation and/or oscillation plane orthogonal to the axis.

Examples of applications for the embodiments described above include (but are not limited to):
aerial systems,
machinery with rotating elements,
earthquakes, and
vehicle accidents, among other applications.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hybrid rotational passive energy absorber (100) configured to mitigate effects of a load on an attached system, comprising:
   a housing (110);
   an axle (170) anchored to the housing at a first axle end and a second axle end;
   a free swinging weighted arm (180) comprising a beam (130) having a length L, a pivot portion (185) disposed at a first end of the beam, and an internal mass (120) at a second end of the beam; and
   a bearing (160) configured to rotatably connect the pivot portion to the axle,
   wherein the bearing is configured to provide smooth motion of the weighted arm around an axis (150) of the axle in a plane of rotation and/or oscillation orthogonal to the axis, and the weighted arm is configured to passively adapt to respond to a first energy excitation with a full rotation around the axle and to respond to a second energy excitation smaller than the first energy excitation with an oscillation of less than a full rotation around the axle.

2. The hybrid rotational passive energy absorber of claim 1, wherein the axle comprises a bolt.

3. The hybrid rotational passive energy absorber of claim 2, wherein the axle is affixed to the housing with a nut.

4. The hybrid rotational passive energy absorber of claim 1, wherein the housing comprises a steel chassis.

5. The hybrid rotational passive energy absorber of claim 1, wherein a base portion of the housing is bolted to the system.

6. The hybrid rotational passive energy absorber of claim 1, wherein the passive energy absorber (100) comprises a mass approximately 10% of the attached system.

7. The hybrid rotational passive energy absorber of claim 1, wherein arm length L is selected to provide a natural frequency of hybrid rotational passive energy absorber based upon a natural frequency of the attached system.

8. A method for mitigating vibration in a system having a first mass, comprising the steps of:

provinding a hybrid rotational passive energy absorber (100), further comprising the steps of:

a housing (110);

anchoring an axle (170) to the housing at a first axle end and a second axle end;

providing a free swinging weighted arm (180) comprising a beam (130) having a length L, a pivot portion (185) disposed at a first end of the beam, and an internal mass (120) at a second end of the beam; and attaching a bearing to the axle;

attaching the pivot portion to the bearing (160) to rotatably connect the pivot portion to the axle, wherein the bearing is configured to provide smooth motion of the weighted arm around an axis (150) of the axle in a plane of rotation and/or oscillation orthogonal to the axis, and the weighted arm is configured to passively adapt to respond to a first energy excitation with a full rotation around the axle and to respond to a second energy excitation smaller than the first energy excitation with an oscillation of less than a full rotation around the axle.

9. The method of claim 8, further comprising the step of affixing the housing to the system.

* * * * *